United States Patent
Sharko

(10) Patent No.: US 9,828,573 B2
(45) Date of Patent: Nov. 28, 2017

(54) ALCOHOL COMPOSITION AND DERIVATIVES THEREOF

(71) Applicant: SHELL OIL COMPANY, Houston, TX (US)

(72) Inventor: Paul Theodore Sharko, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/384,344

(22) Filed: Dec. 20, 2016

(65) Prior Publication Data
US 2017/0175037 A1   Jun. 22, 2017

Related U.S. Application Data

(60) Provisional application No. 62/270,611, filed on Dec. 22, 2015.

(51) Int. Cl.
| | |
|---|---|
| C10M 173/02 | (2006.01) |
| C07C 29/16 | (2006.01) |
| C07C 27/00 | (2006.01) |
| C11D 3/34 | (2006.01) |
| C11D 11/00 | (2006.01) |
| C10M 135/08 | (2006.01) |
| C10M 105/12 | (2006.01) |
| C10M 133/04 | (2006.01) |
| C11D 3/20 | (2006.01) |
| C11D 3/30 | (2006.01) |
| B01F 17/00 | (2006.01) |

(52) U.S. Cl.
CPC ............ *C11D 3/34* (2013.01); *B01F 17/0021* (2013.01); *B01F 17/0092* (2013.01); *C10M 105/12* (2013.01); *C10M 133/04* (2013.01); *C10M 135/08* (2013.01); *C11D 3/2006* (2013.01); *C11D 3/30* (2013.01); *C11D 11/0017* (2013.01); *C10M 2207/021* (2013.01); *C10M 2215/02* (2013.01); *C10M 2219/042* (2013.01)

(58) Field of Classification Search
CPC .................. C10M 2219/044; C07C 29/32
USPC .................. 508/389; 568/883, 902
See application file for complete search history.

(56) References Cited

U.S. PATENT DOCUMENTS

| | | |
|---|---|---|
| 3,231,621 A | 1/1966 | Slaugh et al. |
| 3,239,566 A | 3/1966 | Slaugh et al. |
| 3,239,569 A | 3/1966 | Slaugh et al. |
| 3,239,570 A | 3/1966 | Slaugh et al. |
| 3,239,571 A | 3/1966 | Slaugh et al. |
| 3,440,291 A | 4/1969 | Van Winkle et al. |
| 3,448,157 A | 6/1969 | Slaugh et al. |
| 3,448,158 A | 6/1969 | Slaugh et al. |
| 3,480,556 A * | 11/1969 | De Witt ............ C11D 1/146 510/428 |
| 3,496,203 A | 2/1970 | Morris et al. |
| 3,496,204 A | 2/1970 | Morris et al. |
| 3,501,515 A | 3/1970 | Van Winkle et al. |
| 3,527,818 A | 9/1970 | Mason et al. |
| 4,322,545 A | 3/1982 | Scala, Jr. |
| 5,072,057 A | 12/1991 | Oswald et al. |
| 5,380,763 A | 1/1995 | Sato |
| 7,183,446 B2 | 2/2007 | Zeller et al. |
| 2004/0030200 A1 * | 2/2004 | Zeller ............... C07C 29/16 568/876 |
| 2006/0247148 A1 * | 11/2006 | Ortiz ............... C11D 1/37 510/424 |

FOREIGN PATENT DOCUMENTS

WO   9823566   6/1998

OTHER PUBLICATIONS

"Proponibacterium acnes"; Journal of Natural Products; vol. 57, No. 1; pp. 9-1; Jan. 7, 1994.
Zoller et al.; "Handbook of Detergents Part F: Production"; CRC Press; pp. 24.

* cited by examiner

*Primary Examiner* — Vishal Vasisth

(57) ABSTRACT

The invention provides a composition comprising a mixture of pentadecanols wherein at least about 60 wt % of the mixture is linear pentadecanol and at least about 10 wt % of the mixture is branched pentadecanols wherein the branched pentadecanols have branching on the second carbon atom. The mixture of pentadecanols may be converted to one or more derivatives, and these derivatives may be used in laundry detergents, cleaning products or as an agricultural adjuvant, an emulsifying agent, a lubricant additive, a pour point depressant, or a personal care ingredient.

16 Claims, No Drawings

ALCOHOL COMPOSITION AND DERIVATIVES THEREOF

The present application claims the benefit of U. S. Provisional Patent Application Ser. No. 62/270,611, filed Dec. 22, 2015.

FIELD OF THE INVENTION

The present invention relates to an alcohol composition comprising pentadecanols and derivatives thereof.

BACKGROUND OF THE INVENTION

Pentadecanols are well known in commerce as components of a variety of commercially available fatty alcohol blends. These blends generally consist of fatty alcohols spanning a range of molecular weights. For example, NEODOL® 45 contains mainly alcohols with 14 or 15 carbons; NEODOL 25 contains mainly alcohols with 12, 13, 14, or 15 carbons.

Normal 1-pentadecanol is well known as a fragrance and flavoring ingredient as well as a skin emollient ingredient. It is most commonly obtained by extraction from vegetable materials. For example, it can be obtained from a $CO_2$ extract of angelica seed oil. It can also be obtained from hydrodistilled oil obtained from the stem bark of *Myrica esculenta* Buch. Ham. ex D. Don (Nat Prod Res. 2012; 26(23):2266-9). It is known to have specific activity against *Proponibacterium acnes* (Journal of Natural Products Vol. 57, No. 1, pp. 9-17, January 1994) and can be used as a topical treatment for acne vulgaris (U.S. Pat. No. 5,380,763). Its extraction from vegetable sources limits availability and results in high cost.

A second type of primary pentadecanol is produced by performing the oxo hydroformylation reaction on a linear tetradecene as disclosed in U.S. Pat. No. 7,183,446. This yields a pentadecanol mixture containing 40% or greater of branched species. While this route provides better availability and reduced cost, it yields branched species that may have undesirable properties in some applications if substituted for normal 1-pentadecanol. If this type of pentadecanol is used as a skin emollient or to synthesize useful derivatives like surface active agents, the high degree of branching may limit its functionality in these uses. There is a need for a pentadecanol with a lower proportion of branched species that can be produced in volume and at reasonable cost.

SUMMARY OF THE INVENTION

The invention provides a composition comprising a mixture of pentadecanols wherein at least about 60 wt % of the mixture is linear pentadecanol and at least about 10 wt % of the mixture is branched pentadecanols wherein the branched pentadecanols have branching on the second carbon atom.

The mixture of pentadecanols may be converted to one or more derivatives, and these derivatives may be used in laundry detergents, cleaning products or as an agricultural adjuvant, an emulsifying agent, a lubricant additive, a pour point depressant, or a personal care ingredient.

DETAILED DESCRIPTION OF THE INVENTION

The present invention provides a pentadecanol with a low degree of branching and derivatives made therefrom. The more elongated and less bulky molecular character of this pentadecanol confers superior characteristics to derivatives derived from it. This is particularly apparent in surface active agent derivatives. Surface active agents made with this pentadecanol are expected to exhibit better detergency and soil adsorption than similar surface active agents made with more highly branched pentadecanols. In addition they are likely to be more readily biodegraded in the environment.

The present invention provides a mixture of primary pentadecanols wherein at least about 60 wt % of the mixture is linear pentadecanol and at least about 10 wt % of the mixture is branched pentadecanols wherein the branched pentadecanols have branching on the second carbon atom. The mixture may contain at least about 70 wt % linear pentadecanols. The mixture may contain at least about 15 wt % branched pentadecanols.

The derivatives of the pentadecanols include esters of dicarboxylic acids or other polyacids useful as plasticizers as well as alkoxylated alcohols, sulfated alcohols, sulfated alkoxylated alcohols, alcohol ether amines, or other derivatives with hydrophilic moieties useful as surface active agents.

Linear pentadecanols have the structure (1):

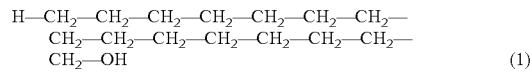

Branched pentadecanols have the general structure (2):

where $R_1$ and $R_2$ are linear alkyl chains containing a total of 13 carbon atoms in the two alkyl chains.

Mixtures having the composition of approximately 60-90 wt % of structure (1) and 10-40 wt % of structure (2) can be synthesized from linear tetradecene by the modified Oxo process, using a phosphine, phosphite, arsine, or pyridine ligand modified cobalt or rhodium catalyst, as described in U.S. Pat. Nos. 3,231,621, 3,239,566, 3,239,569, 3,239,570, 3,239,571, 3,420,898, 3,440,291, 3,448,158, 3,448,157, 3,496,203, 3,496,204, 3,501,515, 3,527,818, the disclosures of which are incorporated herein by reference.

Hydroformylation denotes the reaction of an olefin with CO and $H_2$ to produce an aldehyde/alcohol which has one more carbon atom than the reactant olefin. The term hydroformylation may also cover the step of forming an aldehyde and the subsequent reduction to the alcohol. As used herein, hydroformylation refers to the production of alcohols from olefins via carbonylation and an aldehyde reduction process.

Alcohol derivatives useful as surface active agents are well known in the art. Synthesis and properties of common surface active agents are disclosed in *Handbook of Detergents Part F: Production*, Zoller, Uri and Sosis, Paul CRC Press, 2009, p. 24 and references cited therein.

The present invention includes surface active agents synthesized from a mixture of primary pentadecanols in which at least about 60 wt % of the alkyl chains are linear and at least about 10 wt % of the alkyl chains are branched at the 2-carbon position. Preferred embodiments of this invention include polyalkoxylates, sulfates, sulfated polyalkoxylates, and ether amines of the novel pentadecanol mixture.

U.S. Pat. No. 3,440,291 describes the hydroformylation of linear alpha olefins to form mixtures of branched and linear alcohols. This process applied to linear 1-tetradecene would yield branched and linear pentadecanols. This mixture could be separated by partial crystallization or other methods into several fractions of different concentrations of branched and linear species. By combining these fractions, several samples of pentadecanol mixtures with specified ratios of branched/linear ratios could then be prepared. The branching of samples (1-4) that could be made is shown in Table 1.

TABLE 1

| Sample | Branch to linear ratio |
|--------|------------------------|
| 1      | 10:90                  |
| 2      | 20:80                  |
| 3      | 40:60                  |
| 4      | 60:40                  |

Household Detergent Applications

Alcohols in the range from C12 to C16 are often referred to as detergent alcohols due to the many derivatives that find use as detergent products. In these applications an important property is the rate at which the alcohol biodegrades under aerobic conditions. If an organic chemical biodegrades to a 60% level in 28 days it is considered "readily biodegradable." The alcohol samples 1-4 should be readily biodegradable.

Detergent derivatives of alcohols in the C12 to C16 range have many properties that depend on the length of the carbon chain. In soaps, carboxylate derivatives of alcohols from C12 to C14 are known for their high rate of lather and degree of solubility. Carboxylate derivatives from C15 to C16 are known for their low rate of lather and low solubility. Of these the carboxylate derivatives from C12 to C14, it is known that lathering decreases from C12 to C14 but skin irritation potential also decreases similarly. C15 carboxylates are expected to offer a good balance between lathering and skin irritation potential.

Alcohol sulfate surfactants in the C12 to C16 range are often used in laundry detergent products. Similarly to the carboxylates, C12 alcohol sulfates are known to offer the best flash foam but are also the harshest to the skin. C16 alcohol sulfates are known to not foam as much but are milder. C15 alcohol sulfates are expected to offer a good balance between foaming and skin mildness. This trend is seen in many other classes of surfactant. If choosing between a C12 derivative and a C16 derivative, often the C15 derivative would provide a good compromise.

The presence of low levels of branching provides a benefit to handling the alcohol in processing. The higher the branching content, the higher the pour point, affording ease and economy in processing. Branching in alcohol derivatives also show benefits. In alcohol sulfates, branching raises the Krafft point resulting in greater solubility and a broader effective temperature range. On the opposite hand, soil removal properties are often impacted negatively by high degrees of branching. We find that alcohols having 10-40% branching provide an optimal tradeoff between low temperature solubility and soil removal for many surfactant derivatives.

Similar results are expected for other derivatives including carboxylate, sulfate, alkoxylate, and alkoxylate sulfate derivatives. In many cases the range of preferred properties would be demonstrated when the hydrophobe is C15 and the branching level is 10% to 40%. We would expect to see similar results in other classes of surfactants not mentioned here. Additionally we anticipate other useful derivative mixtures could be used as an agricultural adjuvant, an emulsifying agent, a lubricant additive, a pour point depressant, or a personal care ingredient.

The invention claimed is:

1. A composition comprising a mixture of pentadecanols wherein at least about 60 wt % of the mixture is linear pentadecanol and at least about 10 wt % of the mixture is branched pentadecanols wherein the branched pentadecanols have branching on the second carbon atom.

2. The composition of claim 1 wherein at least about 70 wt % of the mixture is linear pentadecanol.

3. The composition of claim 1 wherein at least about 15 wt % of the mixture if branched pentadecanols.

4. A composition comprising one or more derivatives of the pentadecanol mixture as claimed in claim 1.

5. The composition of claim 4 wherein the derivatives comprise esters of dicarboxylic acids, esters of polycarboxylic acids, alkoxylated alcohols, sulfated alcohols, sulfated alkoxylated alcohols and alcohol ether amines.

6. The composition of claim 4 wherein the derivative comprises a diester of the pentadecanol mixture with one or more diacids.

7. The composition of claim 6 wherein the diacids comprise phthalic acid, adipic acid, sebacic acid and succinic acid.

8. The composition of claim 4 wherein the derivative comprises a polyester of the pentadecanol mixture with one or more polyacids.

9. The composition of claim 8 wherein the polyacid comprises trimellitic acid.

10. The composition of claim 4 wherein the derivatives comprise a polyalkoxylate, sulfate, sulfated polyalkoxylate or ether amine.

11. A hard surface cleaning formulation comprising the composition of claim 10.

12. A laundry detergent formulation comprising the composition of claim 10.

13. The use of the composition of claim 4 as an agricultural adjuvant, an emulsifying agent, a lubricant additive, a pour point depressant, or a personal care ingredient.

14. The composition of claim 1 wherein at least about 65 wt % of the mixture is linear pentadecanol and at least about 15 wt % of the mixture is branched pentadecanols.

15. The composition of claim 1 wherein from 60-80 wt % of the mixture is linear pentadecanol.

16. The composition of claim 1 wherein from 10-25 wt % of the mixture is branched pentadecanols.

* * * * *